US00RE41061E

(19) United States
(12) Reissued Patent
Zinn

(10) Patent Number: US RE41,061 E
(45) Date of Reissued Patent: Dec. 29, 2009

(54) HIGH EFFICIENCY LINEAR REGULATOR

(75) Inventor: Raymond Zinn, Atherton, CA (US)

(73) Assignee: Micrel, Inc., San Jose, CA (US)

(21) Appl. No.: 11/874,818

(22) Filed: Oct. 18, 2007

Related U.S. Patent Documents

Reissue of:
(64) Patent No.: 7,084,612
Issued: Aug. 1, 2006
Appl. No.: 10/837,228
Filed: Apr. 30, 2004

(51) Int. Cl.
*G05F 1/563* (2006.01)

(52) U.S. Cl. ..... 323/266; 323/284; 323/285
(58) Field of Classification Search ..... 323/266, 323/268, 273, 282, 284, 285
See application file for complete search history.

(56) References Cited

U.S. PATENT DOCUMENTS

| | | | | | |
|---|---|---|---|---|---|
| 4,447,866 | A | | 5/1984 | Reeves | |
| 4,459,537 | A | * | 7/1984 | McWhorter | 323/224 |
| 4,881,023 | A | * | 11/1989 | Perusse et al. | 323/266 |
| 4,893,228 | A | * | 1/1990 | Orrick et al. | 363/98 |
| 5,216,351 | A | * | 6/1993 | Shimoda | 323/224 |
| 5,216,353 | A | * | 6/1993 | Mori | 323/266 |
| 5,262,930 | A | | 11/1993 | Hua et al. | |
| 5,357,418 | A | * | 10/1994 | Clavel | 363/89 |
| 5,525,895 | A | * | 6/1996 | Fishman | 323/268 |
| 5,592,072 | A | | 1/1997 | Brown | |
| 6,343,222 | B1 | | 1/2002 | Jones | |
| 6,469,478 | B1 | * | 10/2002 | Curtin | 323/266 |
| 6,850,044 | B2 | * | 2/2005 | Hansen et al. | 323/266 |
| 6,937,487 | B1 | * | 8/2005 | Bron | 363/60 |
| 7,084,612 | B2 | * | 8/2006 | Zinn | 323/266 |

OTHER PUBLICATIONS

Joe Vanden Wynelenberg, "Choosing an Inductor for Your ML4861 Application," Fairchild Semiconductor, Application Note 42011, Jun. 1996, pp. 1–11.*

* cited by examiner

*Primary Examiner*—Jeffrey L Sterrett
(74) *Attorney, Agent, or Firm*—Patent Law Group LLP; Brian D. Ogonowsky

(57) ABSTRACT

A single chip hybrid regulator is disclosed having a first stage being a switching regulator and a second stage being a linear regulator. The switching regulator uses a filter circuit including an inductor and a capacitor. To make the hybrid regulator very small, the inductor value is selected so that the inductor saturates at a current level well below the maximum load current for the regulator. At low load currents, the small inductor does not saturate, and the regulated voltage applied to the input of the linear regulator presents only a small differential voltage across the series transistor of the linear regulator, resulting in very little power being wasted by the series transistor. At higher currents, the small inductor begins to saturate or fully saturates; however, the increased ripple is smoothed by the linear regulator. For applications, such as cell phones, where the regulator operates at low currents for the vast majority of the time, the overall efficiency of the regulator is extremely high and the regulated voltage is very smooth. As the inductor becomes highly saturated, or if the switching regulator cannot supply sufficient current, the switching regulator may be bypassed by the closing of a switch to continuously couple the power supply input voltage to the input of the linear regulator.

45 Claims, 4 Drawing Sheets

HIGH EFFICIENCY LINEAR REGULATOR

Matter enclosed in heavy brackets [ ] appears in the original patent but forms no part of this reissue specification; matter printed in italics indicates the additions made by reissue.

FIELD OF THE INVENTION

This invention relates to voltage regulators and, in particular, to a hybrid regulator comprising a switching regulator and a linear regulator.

BACKGROUND

Switching regulators and linear regulators are well known types of voltage regulators for converting an unregulated voltage, such as a battery voltage, to a regulated DC voltage of a desired value. One type of switching regulator is a pulse width modulation (PWM) regulator that turns a switching transistor on and off at a certain frequency. In a conventional buck regulator topology, the power supply voltage is intermittently coupled to an inductor, and the inductor conducts a triangular current waveform to recharge an output filter capacitor. The charged filter capacitor provides a relatively constant voltage to the load. A feedback signal, which is typically the output voltage, determines when to shut off the switching transistor during each switching cycle. The switch on-time percentage is called the duty cycle, and this duty cycle is regulated so as to provide a substantially constant voltage at the output despite load current changes. There are many types of switching regulators.

A linear regulator, also referred to as a low dropout (LDO) regulator, controls the conductance of a transistor in series between the unregulated power supply and the output terminal of the regulator. The conductance of the transistor is controlled based upon the feedback voltage to keep the output voltage at the desired level.

Switching regulators are generally considered to be more efficient than linear regulators since the switching transistor is either on or off. When a transistor is fully on, such as in saturation or near the edge of saturation, the transistor is a highly efficient switch, and there is a minimum of wasted power through the switch. However, due to the pulsing of the current through the switch, a relatively large size filter circuit, consisting of an inductor and a capacitor, is needed so as to provide a low-ripple regulated voltage at the output. The inductor must be sized to not saturate at the highest rated load current for the switching regulator under worst case conditions. The size of the capacitor is based upon the frequency of the switching regulator and the allowable ripple. Accordingly, it is difficult to provide a very small switching regulator, including the filter circuitry, in a very small size while supplying a low-ripple regulated voltage.

A linear regulator, on the other hand, provides a very smooth output since the series transistor is always conducting. However, due to the large voltage differential across the transistor, power is wasted through the transistor, and substantial heat may be generated.

It is known to use a linear regulator at the output of a switching regulator to further smooth the output of the switching regulator for applications which require extremely steady regulated voltages. However, the resulting power supply is still relatively large due to the switching regulator inductor being sized so as not to saturate at the maximum load current under worst case conditions. The size of the inductor and capacitor dominate the overall size of the regulator.

What is needed is a smaller size regulator that supplies a very smooth regulated output with high efficiency.

SUMMARY

An extremely compact hybrid regulator is disclosed having a first stage being a switching regulator and a second stage being a linear regulator. The switching regulator uses a filter circuit including an inductor and a capacitor. To make the hybrid regulator very small, the inductor value is selected so that the inductor saturates at a current level well below the maximum load current. For example, the inductor value may be less than one quarter that of the conventionally selected inductor value for a similar switching regulator application.

At low load currents, the small inductor does not saturate, and the inductor/capacitor filter presents a low-ripple voltage to the input of the linear regulator, where the low-ripple voltage is slightly higher than the desired output voltage of the linear regulator. The small voltage differential across the linear regulator series transistor results in very little power wasted by the series transistor. The highly efficient linear regulator smoothes out any ripple, resulting in a very smooth regulated voltage.

At higher currents, the small inductor begins to saturate or fully saturates, greatly reducing its inductance value and causing the inductor to act more like a resistor or short circuit. At these higher currents, the ripple at the output of the switching regulator is much greater, causing the voltage differential across the series resistor of the linear regulator to be greater. The series transistor smoothes out the ripple to present a smooth regulated output voltage at the output of the linear regulator. The increased inefficiency of the linear regulator, due to the higher differential, is acceptable in applications where the electrical device incorporating the regulator operates at low currents for a majority of the time, such as the case with cellular telephones.

Since the linear regulator smoothes the output of the switching regulator, the switching regulator can be very simple and small, further reducing the size of the hybrid regulator.

As the load current further increases, the inductor increasingly saturates and the peak-to-peak ripple voltage into the linear regulator increases, causing the switching regulator to become less and less effective in reducing the differential across the series transistor. Also, due to the small size of the switching regulator and the filter circuitry, the maximum current delivered by the switching regulator may be below that needed by the load. To overcome these issues, at a certain threshold current, a switch is closed to cause the power supply voltage to be continuously coupled to the input of the linear regulator, effectively bypassing the switching regulator. The coupling of the power supply voltage to the linear regulator may be made through the switching transistor being forced on or through a separate switch completely bypassing the switching regulator. To further increase efficiency at high currents, the control circuitry for the switching regulator may be completely shut down.

The resulting hybrid regulator, including the inductor, can be formed on a single chip using conventional techniques, unlike regulators where the inductor must be sized to not saturate under worst case conditions. If the switching frequency is sufficiently high, the capacitor can also be formed on the same chip as the regulator.

DETAILED DESCRIPTION

Figure 1:
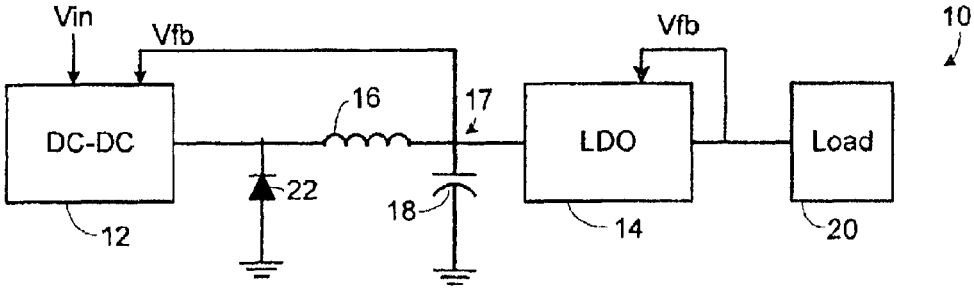
FIG. 1 is a block diagram illustrating one embodiment of the invention.

FIG. 1 illustrates a hybrid regulator 10 including a switching regulator 12 and a linear regulator 14, also referred to as a low dropout (LDO) regulator. Switching regulator 12 may be any type of regulator, as further described below.

Switching regulator 12 controls a switch (not shown) to be on and off, using various types of techniques, so as to intermittently couple the power supply voltage Vin to the input of an inductor 16. The amount of time that the switch is on versus the total time is called the duty cycle and determines the voltage at node 17 at a particular load current. As will be discussed below, inductor 16 is relatively small since it is intended to saturate well below the maximum load current.

When the switch is turned on, Vin is coupled to the input of inductor 16, which generates a ramped current through inductor 16. This ramped current charges filter capacitor 18, which causes a rising voltage at node 17. When the switch turns off, the voltage at the left end of the inductor reverses polarity and diode 22 conducts to complete the circuit to ground. Diode 22 is typically a Schottky diode, which has a voltage drop that is lower than a conventional PN diode. The energized state of inductor 16 causes the current to now ramp down until the start of the next switching cycle. Capacitor 18 filters the triangular waveform so as to crate a low-ripple voltage at node 17.

In conventional switching regulators, the sizes of the inductor and capacitor are selected to produce a very low ripple under worst case conditions. However, as discussed further below, the sizes of inductor 16 and capacitor 18 may be made small since the LDO regulator 14 smoothes out even a high peak-to-peak ripple voltage. Accordingly, the switching regulator 12 and the filter circuitry may be made very small.

LDO regulator 14 includes a series transistor between its input and output, where the conductance of the series transistor is controlled by sensing a feedback voltage Vfb. The feedback voltage and a reference voltage are input to an error amplifier, and the output of the error amplifier is coupled to the gate or base of the series transistor to constantly adjust the conductance of the series transistor to match the feedback voltage with the reference voltage. Thus, the regulated voltage to the load 20 is extremely smooth.

In conventional switching regulators, inductors are chosen to not saturate under worst case conditions (e.g., maximum load current and lowest power supply voltage). Also, in conventional designs, the inductor value selected (typically on the order of tens or hundreds of microhenries) is much greater (e.g., 5×) than the minimum value for avoiding saturation since higher inductor values reduce peak inductor currents so as to reduce losses. Accordingly, typical prior art inductor values in conventional switching regulators may be multiple times that needed to avoid saturation, resulting in a relatively large inductor that could not be put on the same chip as the regulator.

The present invention uses a relatively small inductor that is sized so as to not saturate at low current levels (e.g., up to 25% of maximum load current) where the electrical device incorporating the regulator typically operates a majority of the time. For example, in cellular telephones, for the vast majority of the time, the cell phone is in a sleep mode, drawing as little as 1 mA. While in the transmitting mode, the cell phone may draw 100 mA. Accordingly, for a cell phone application, the value of inductor 16 in FIG. 1 may be selected so that it begins to saturate at a load current of, for example, 20 mA or less. Such an inductor may be less than 10 microhenries. In contrast, a conventional inductor value used for such a cell phone may be 60 microhenries or higher to avoid saturation at the maximum load current. The inductance value of inductor 16 depends on many factors and must be calculated for the particular application. Such a small inductor can be fabricated on-chip so as to greatly reduce the size and cost of the hybrid regulator 10.

Assuming that inductor 16 begins to saturate at 25% of the maximum load current, the effective inductor value starts dropping as the inductor acts more and more like a resistor (or short circuit). This increases the ripple into the LDO regulator 14, but this ripple is smoothed by the constant control of the series transistor in LDO regulator 14. As the differential across the series transistor increases, the efficiency of the LDO regulator 14 is reduced, but this temporary lowering of efficiency does not offset the benefits of the high efficiency operation of the regulator 14 at lower load currents due to the infrequent operation at the higher currents.

The inductor 16 may be chosen to begin saturating at any percentage of the maximum load current, such as 50%, 25%, and even 10% or less depending upon the particular application in which the regulator is used.

Figure 2:
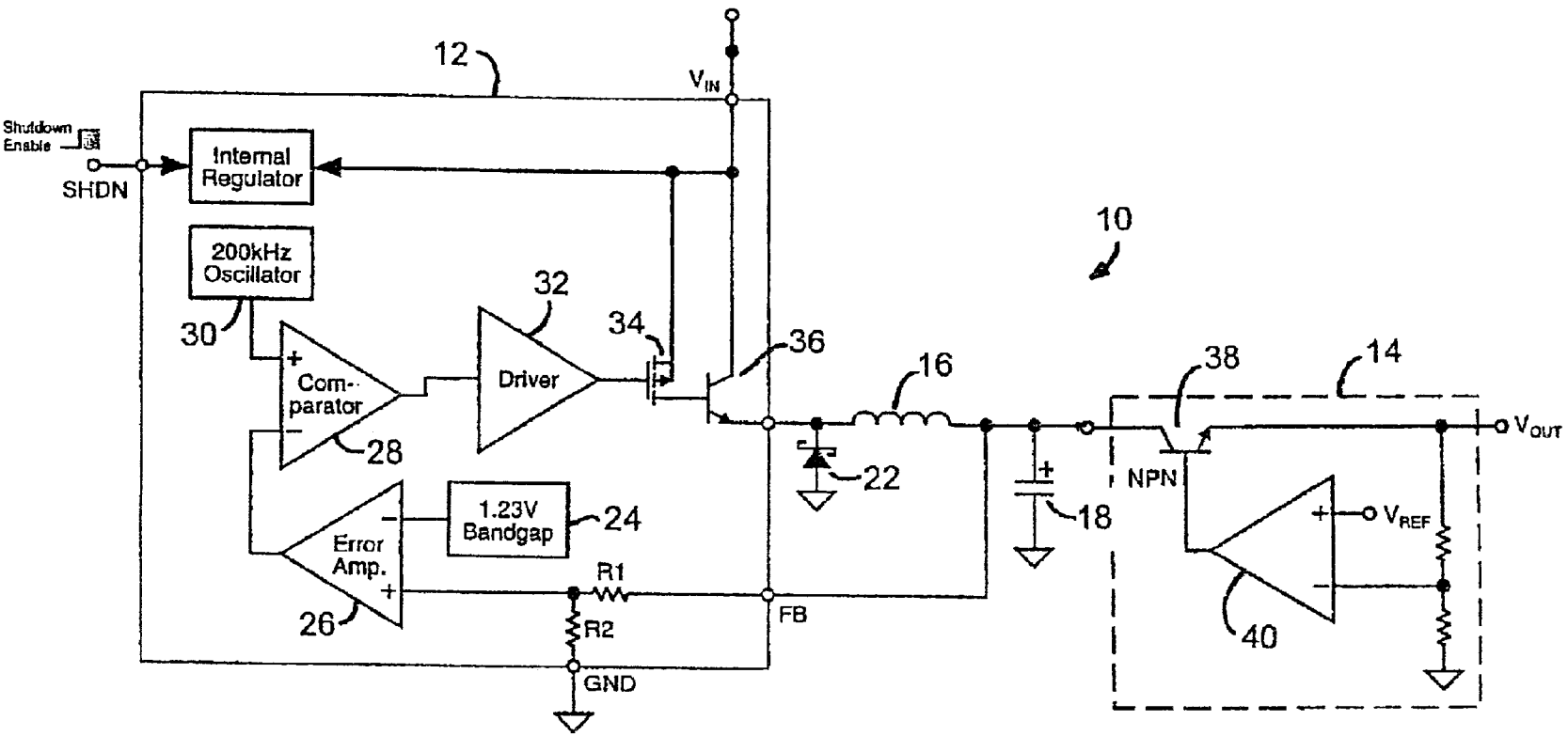
FIG. 2 is a high level circuit diagram of one embodiment of the hybrid regulator of FIG. 1, where a PWM regulator is used as the switching regulator.

FIG. 2 illustrates a conventional switching regulator 12 and a conventional LDO regulator 14 connected as shown in FIG. 1. The voltage at the filter capacitor 18 is applied across a resistor divider R1/R2 so that, at the desired capacitor 18 voltage, the divided voltage equals a reference voltage 24. The divided voltage and reference voltage are applied to an error amplifier 26, whose output is coupled to the input of a comparator 28. A compensation capacitor (not shown) may be coupled to the output of the error amplifier 26. To the other input of comparator 28 is coupled a sawtooth waveform of an oscillator 30. When the ramped signal from oscillator 30 is below the error amplifier 26 level, the comparator 28 supplies an on signal to driver 32, which turns on a driver MOSFET 34. Driver MOSFET 34 provides the base current to an NPN transistor 36, which connects the power supply voltage Vin to inductor 16. When the oscillator ramp crosses the error amplifier 26 level, transistor 36 is turned off.

The turning on and turning off of the NPN transistor 36 causes a generally triangular current waveform to flow through inductor 16. Filter capacitor 18 charges and discharges to generate a rippling output voltage at its node. A series transistor 38 in LDO regulator 14 is controlled by an error amplifier 40 receiving a divided output voltage and a reference voltage. Error amplifier 40 controls the conductance of series transistor 38 to be whatever conductance is needed to match the feedback voltage to the reference voltage. The conductance varies so as to greatly reduce the relatively high ripple voltage at the node of capacitor 18. The series transistor may be any type of transistor such as a P or N type MOSFET or bipolar transistor.

Many types of switching regulators and LDO regulators are known. Since the requirements of the switching regulator are very lax, switching regulator 12 may be made very simple and small and consume little power.

Figure 3:
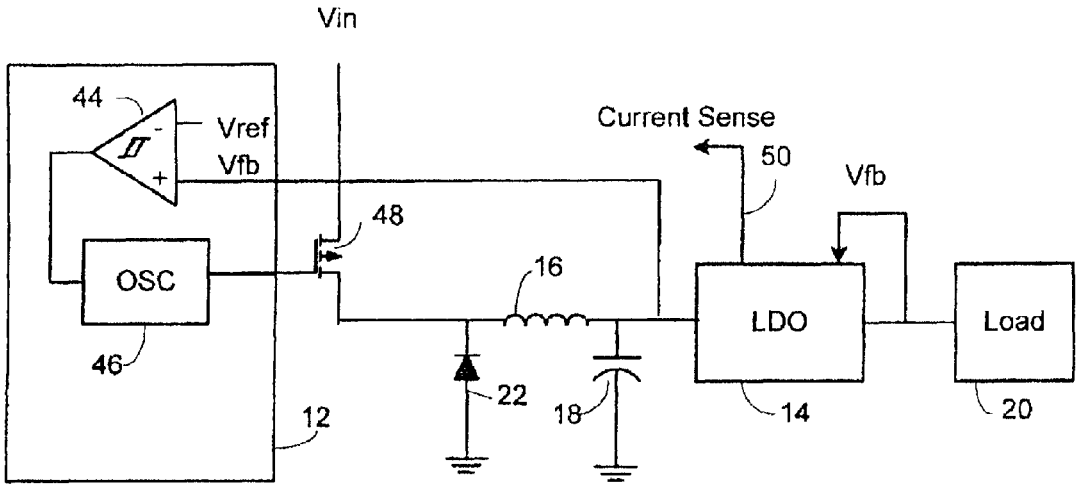
FIG. 3 illustrates another embodiment of the hybrid regulator where a bang-bang type of switching regulator is used.

FIG. 3 illustrates another type of switching regulator 12 that includes a hysteretic comparator 44 and an oscillator 46. Comparator 44 compares the feedback voltage at the node of capacitor 18 to a reference voltage. If the feedback voltage is too low, oscillator 46 is turned on to switch transistor 48 on and off to incrementally charge capacitor 18 at a fixed duty cycle. Each pulse charges capacitor 18 a predetermined amount until the feedback voltage increases above the reference voltage, turning comparator 44 off. The regulator 12 is then dormant until capacitor 18 has discharged to the point where the feedback voltage is below the reference voltage by a certain amount. The relatively large voltage swings at the node of the capacitor 18 are smoothed by LDO regulator 14 as described above. Switching regulator 12 is sometimes referred to as a bang-bang regulator and is extremely simple, small, and highly efficient since, at low currents, it is dormant except for comparator 44.

FIG. 3 also introduces a current sense signal 50 that senses the load current. Signal 50 could be used for various purposes, such as shutting down the regulator 10 for an overcurrent condition and/or overriding switching regulator 12 to force transistor 48 to be constantly on at high currents (e.g., over 50% of the maximum load current) so as to effectively couple Vin to the input of LDO regulator 14 through the highly saturated inductor 16. For example, the small size of regulator 12 and filter circuitry may be such that regulator 12 cannot supply sufficient current to power the load at above the sense signal 50 level. Sense signal 50 then triggers transistor 48 to remain on until the sense signal 50 drops below a threshold.

The switching regulator 12 may be other types, such a constant-off time type, a variable frequency type, a current mode type, a boost type, a buck/boost type, or other type. In certain topologies (e.g., boost), the inductor is couple to the LDO regulator through a diode.

Figure 4:
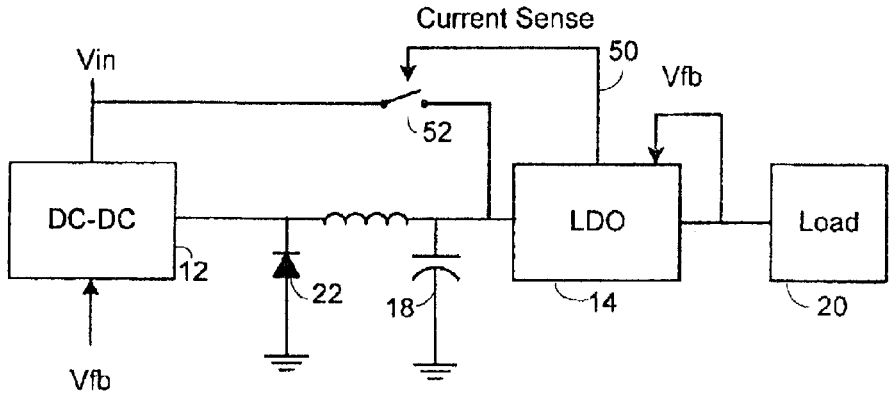
FIG. 4 illustrates another embodiment of the hybrid regulator where an output current is sensed for determining when to continuously couple the power supply voltage to the input of the linear regulator.

FIG. 4 illustrates the use of the current sense signal 50 for closing and opening a separate switch 52. Switch 52 is closed when the load current exceeds a certain threshold. This current threshold may be at the point where inductor 16 becomes sufficiently saturated during each switching cycle so as to provide little filtering of the pulsed current through the switching transistor internal to switching regulator 12, as explained in more detail below. When the switching transistor in regulator 12 is on, the current through inductor 16 increases. At some sufficiently high current, inductor 16 will begin to saturate and the slope of the current through the inductor will increase more and more as the inductor becomes more and more saturated. This increases the ripple of the voltage applied to the input of the LDO regulator 14 and thus causes the increased differential across the series transistor to lower the efficiency of the LDO regulator 14. At some point, the benefits of the switching regulator 12 portion become trivial or nonexistent and regulator 12 is bypassed by switch 52 closing to continuously couple the power supply Vin to the input of the LDO regulator 14. An example of such a current switching point may be 25–75% of the maximum load current. When the sensed current is below the threshold, switch 52 is opened. Switch 52 may simply be a transistor that receives a signal from a hysteretic comparator comparing the current sense signal to a reference signal.

Switch 52 may also be closed at the point where switching regulator 12 can no longer supply adequate current to the load.

Figure 5:
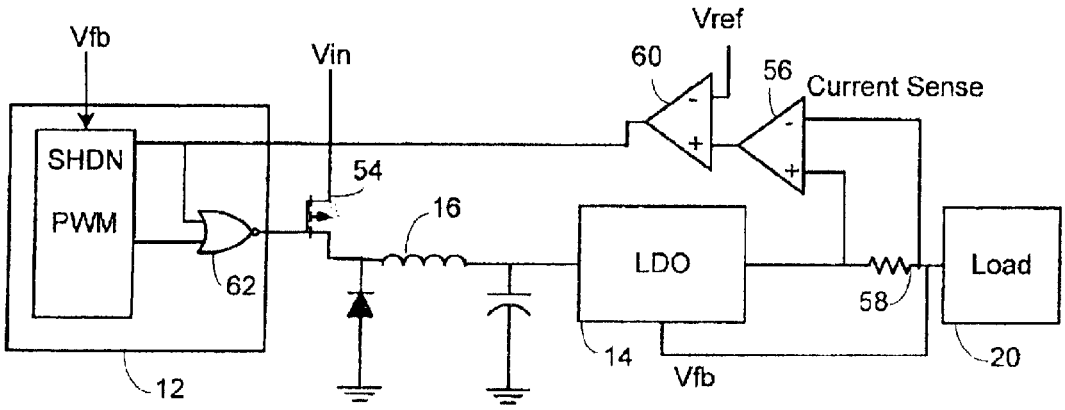
FIG. 5 is a particular embodiment of the circuit of FIG. 4.

FIG. 5 illustrates in more detail one embodiment of a circuit for carrying out the function of FIG. 4. In FIG. 5, the PMOS switching transistor 54 also serves as the switch 52 in FIG. 4. A current sense amplifier 56 measures the load current through resistor 58 by detecting the voltage drop. The sense signal is then compared by a current comparator 60 to a current reference, where comparator 60 generates a high signal when a threshold signal is exceeded. This signal is applied to a NOR gate 62 that also receives the switching regulator control signal so that either the control signal or the comparator 60 signal will turn on the switching transistor 54. As long as the current through resistor 58 exceeds the threshold, NOR gate 62 will force transistor 54 to be on, coupling Vin to the LDO regulator 14 through the fully saturated inductor 16. The term fully saturated is defined herein to mean that the effective inductor value is less than 10% of its non-saturated value.

The output of comparator 16 may also be applied to a shut down terminal or a sleep/standby terminal of the switching regulator 12 so as to shut down the control circuitry while transistor 54 is being forced on.

Sensing the current at the output of the LDO regulator 14 is very simple since regulator 14 is on all the time. This obviates the need for switching regulator 12 to sense the current.

Figure 6:
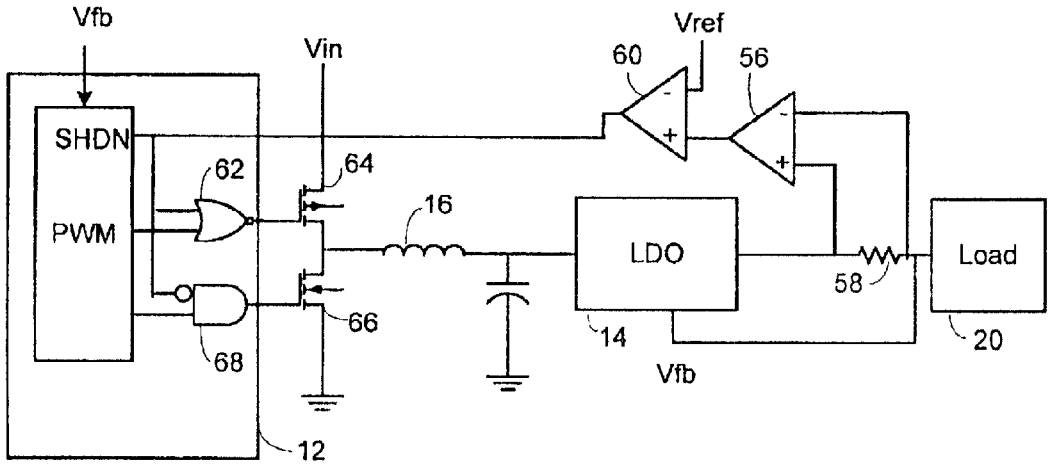
FIG. 6 illustrates a hybrid regulator where the switching regulator controls synchronously switched transistors and where the switching regulator is bypassed at high currents.

FIG. 6 illustrates a circuit similar to FIG. 5 except that the switching regulator 12 is one that synchronously switches a high side switch 64 and a low side switch 66, which acts as a synchronous rectifier to replace diode 22. AND gate 68 ensures transistor 66 is off when transistor 64 is continuously turned on when the output current exceeds the threshold of comparator 60.

Using the various techniques described above, the inductor is allowed to saturate below the maximum load current with no adverse effects. This enables the use of an inductor of, for example, less than 50% the size of the conventional inductor size. For applications such as cell phones and other relatively low power equipment, such an inductor can easily be placed on the same chip as the entire hybrid regulator. In one embodiment, only the filter capacitor 18 is external to the chip. Capacitor 18 may be placed on the chip if the switching frequency is sufficiently high. The size of the inductor will be selected based upon efficiency and operational tradeoffs. For example, if 95% of the time the load is operating at less than 10 percent of the maximum current, the size of the inductor may be selected to begin saturating at 20 percent of the maximum load current since any decrease in efficiency due to the saturated inductor in the high current operation is offset by the increased efficiency at the lower current operation.

The overall result is a single chip hybrid regulator, having an efficiency on the order of 80%, that produces an extremely smooth voltage due to the LDO regulator 14.

Figure 7:
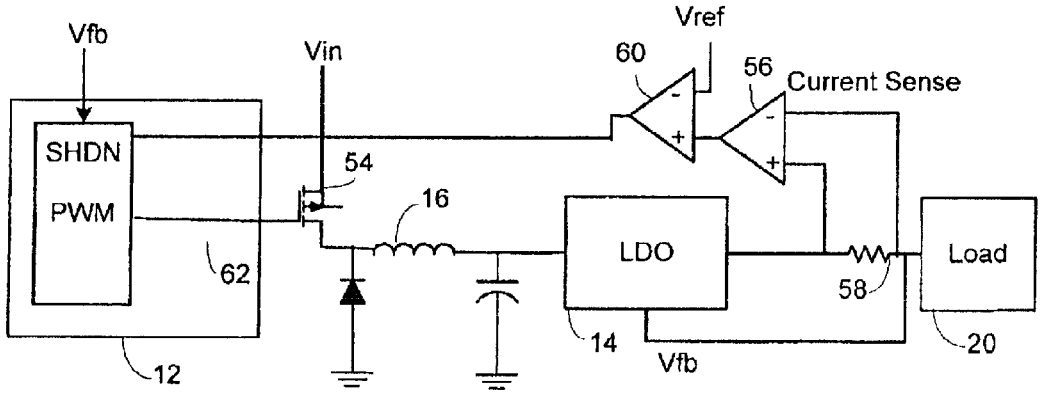
FIG. 7 illustrate a hybrid regulator with a current limit circuit sensing the DC output of the linear modulator.

FIG. 7 illustrates an additional benefit of connecting a LDO regulator to the output of a switching voltage regulator, where a current limit circuit senses the DC current output of the LDO regulator 14 in order to detect a potentially damaging overcurrent condition. If only a switching regulator were used to supply power to a load, the current limit circuitry would have to sense the current through the switching transistor 54 of the switching regulator. Such a current limit circuit has drawbacks since the current through the switching transistor is typically a triangular waveform due to the inductor preventing instantaneous changes in current through the transistor 54. Since setting the current limit is typically a thermal consideration (a sustained high current generates heat), an instantaneous peak current of a triangular waveform exceeding the current limit would prematurely shut down the regulator since the regulator could have tolerated the trigger current for a much longer period without damage. Accordingly, the current limit circuits in the prior art switching regulators that measure the instantaneous switching transistor current are typically designed too conservatively since the current limit circuit cannot distinguish between an instantaneous high current of a triangular waveform and a sustained high current. A designer could place a sense resistor at the DC output of the switching regulator's filter capacitor to measure the DC current (average current through the switching transistor) but this requires connections external to the chip and more expense.

Since, in FIG. 7, the LDO regulator 14 series transistor is always on, the output current is essentially constant, and it is very easy to measure the current through the series transistor and thus the average current through the switching transistor 54. A constant current provides the best indication of a potentially damaging overcurrent condition. By measuring the DC current, rather than a triangular waveform, it is known that an overcurrent will be sustained and thus harm the regulator unless the regulator is shut down. The current sense amplifier 56 and current comparator 60 are used to detect when the current through the series resistor 58 exceeds a current limit threshold set by Vref. Such a current limit is a level above which the regulator may be damaged or above which the regulator can no longer regulate the voltage. The output of comparator 60 is shown connected to a shutdown terminal of the switching regulator 12 to stop the current flow when the output current exceeds the limit. A reset circuit may be included to turn the regulator back on in the event the overcurrent situation has ended.

The series resistor 58, current sense amplifier 56, and comparator 60 can easily be formed on the same chip as the switching regulator 12 and LDO regulator 14.

Having described the invention in detail, those skilled in the art will appreciate that, given the present disclosure, modifications may be made to the invention without departing from the spirit and inventive concepts described herein. Therefore, it is not intended that the scope of the invention be limited to the specific embodiments illustrated and described.

What is claimed is:

1. A voltage regulator comprising:

a switching voltage regulator comprising a power switch electrically coupled to a first terminal of an inductor, the switch being controlled to turn on and off based on a feedback signal to the switching voltage regulator; and a linear regulator, having an input electrically coupled to a second terminal of the inductor, for smoothing out ripples in the voltage applied to the input and outputting a regulated voltage, the combined switching regulator and linear regulator for providing a maximum load current, the inductor having an inductance value such that the inductor at least partially saturates at load currents below the maximum load current.

2. The regulator of claim 1 wherein the input of the linear regulator is directly coupled to the second terminal of the inductor.

3. The regulator of claim 1 wherein the inductor begins to saturate [at] *prior to* 75% of the maximum load current.

4. The regulator of claim 1 wherein the inductor begins to saturate [at] *prior to* 50% of the maximum load current.

5. The regulator of claim 1 wherein the inductor begins to saturate [at] *prior to* 40% of the maximum load current.

6. The regulator of claim 1 wherein the inductor begins to saturate [at] *prior to* 30% of the maximum load current.

7. The regulator of claim 1 wherein the inductor begins to saturate [at] *prior to* 20% of the maximum load current.

8. The regulator of claim 1 wherein the inductor begins to saturate [at] *prior to* 10% of the maximum load current.

9. The regulator of claim 1 wherein the inductor fully saturates at a current below [at] 75% of the maximum load current.

10. The regulator of claim 1 wherein the switching regulator is a buck regulator.

11. The regulator of claim 1 wherein the switching regulator is a pulse width modulation regulator.

12. The regulator of claim 1 wherein the linear regulator comprises an error amplifier controlling the conductance of a series transistor coupled between the input and output of the linear regulator.

13. The regulator of claim 1 wherein the combined switching regulator and linear regulator is formed as a single integrated circuit.

14. The regulator of claim 1 wherein the combined switching regulator, linear regulator, and inductor is formed as a single integrated circuit.

15. The regulator of claim 1 further comprising a filter capacitor coupled to the second terminal of the inductor.

16. The regulator of claim 1 further comprising:

a current sensor for sensing when a current exceeds a threshold and, in response to the sensing, issuing a first signal; and logic circuitry coupled to the power switch for forcing on the power switch in response to the first signal so a power supply input voltage terminal is continuously coupled to the input of the linear regulator.

17. The regulator of claim 16 wherein the first signal is generated at a current level that causes the inductor to be at least partially saturated during a switching cycle.

18. The regulator of claim 1 further comprising:

a current sensor for sensing when a current exceeds a threshold and, in response to the sensing, issuing a first signal; and a switch, other than the power switch, for continuously coupling a power supply input voltage terminal to the input of the linear regulator in response to the first signal.

19. The regulator of claim 18 wherein the first signal is generated at a current level that causes the inductor to be at least partially saturated during a switching cycle.

20. The regulator of claim 1 wherein the regulated voltage output by the linear regulator is coupled to circuitry in an electrical device that operates in a low current mode for a majority of the time, where the inductor does not operate in saturation.

21. The regulator of claim 20 wherein the electrical device is a cellular telephone.

22. A voltage regulator comprising:

a switching voltage regulator comprising a power switch electrically coupled to a first terminal of an inductor, the switch being controlled to turn on and off based on a feedback signal to the switching voltage regulator;

a linear regulator, having an input electrically coupled to a second terminal of the inductor, for smoothing out ripples in the voltage applied to the input and outputting a regulated voltage;

a current sensor for sensing when a current exceeds a threshold and, in response to the sensing, issuing a first signal; and a switch, other than the power switch, for continuously coupling a power supply input voltage terminal to the input of the linear regulator in response to the first signal.

23. The regulator of claim 22 wherein the combined switching regulator and linear regulator is for providing up to a maximum load current, wherein the switching regulator is unable to provide the maximum load current, and wherein the first signal causes the switch to continuously couple the power supply input voltage terminal to the input of the linear regulator during times when the switching regulator is unable to provide sufficient current to power a load.

24. A method performed by a hybrid regulator, the regulator for providing a maximum load current, comprising:

generating a pulsed signal by a switching regulator turning on and off a power switch, the pulsed signal being applied to an inductor and a capacitor to generate a first regulated voltage at a first terminal;

controlling the conductance of a series transistor in a linear regulator, having a second terminal electrically coupled to the first terminal, so that a second regulated voltage is generated at an output terminal of the linear regulator; and at least partially saturating the inductor prior to the hybrid regulator generating the maximum load current.

25. The method of claim 24 wherein the step of at least partially saturating the inductor comprises at least partially saturating the transistor prior to the regulator reaching 50% of the maximum load current.

26. The method of claim 24 further comprising controlling the power switch to continuously stay on, after a current threshold is detected indicative of the inductor being in at least a partially saturated state, so as to continuously couple a power supply voltage to the input of the linear regulator.

27. The method of claim 24 further comprising controlling a switch, other than the power switch, to continuously stay on, after a current threshold is detected indicative of the inductor being in at least a partially saturated state, so as to continuously couple a power supply voltage to the input of the linear regulator.

28. A method performed by a hybrid regulator, the regulator for providing a maximum load current, comprising:

generating a pulsed signal by a switching regulator turning on and off a power switch, the pulsed signal being applied to an inductor and a capacitor to generate a first regulated voltage at a first terminal;

controlling the conductance of a series transistor in a linear regulator, having a second terminal electrically coupled to the first terminal, so that a second regulated voltage is generated at an output terminal of the linear regulator;

sensing when a current exceeds a threshold and, in response to the sensing, issuing a first signal; and controlling a switch, other than the power switch, for continuously coupling a power supply input voltage terminal to the input of the linear regulator in response to the first signal.

29. The method of claim 28 wherein the switching regulator is unable to provide the maximum load current, and wherein the step of controlling the switch comprises controlling the switch to continuously couple the power supply input voltage terminal to the input of the linear regulator during times when the switching regulator is unable to provide sufficient current to power the load.

30. A hybrid voltage regulator comprising:

a switching voltage regulator comprising a power switch electrically coupled to a first terminal of an inductor, the switch being controlled to turn on and off based on a feedback signal to the switching voltage regulator;

a linear regulator, having an input electrically coupled to a second terminal of the inductor, for smoothing out ripples in the voltage applied to the input and outputting a regulated voltage;

a current sense amplifier connected to detect the output current of the linear regulator; and a current limit comparator receiving a signal from the current sense amplifier and generating a current limit signal when the current output by the linear regulator exceeds a threshold, the current limit comparator being connected to suspend operation of the *switching* voltage regulator when the current limit signal is generated.

*31. A transformerless DC-DC step down voltage regulator comprising:*

*a switching voltage regulator comprising a power switch having a first terminal connected to a power supply, the power switch being controlled to turn on and off based on a feedback signal;*

*a non-transformer inductor, a first terminal of the inductor being coupled to a second terminal of the power switch to receive a pulse of voltage from the power switch when the power switch is turned on and, in response, generate a ramping current through the inductor, the switching voltage regulator for providing a maximum load current at a regulated output voltage, the inductor having an inductance value such that the inductor at least partially saturates at load currents below the maximum load current under normal operating conditions as the inductor conducts the ramping current;*

*a rectifying device having a first terminal connected to a node between the inductor and the power switch and a second terminal connected to a fixed reference potential, the rectifying device conducting only when a voltage at the first terminal is less than the reference potential; and*

*a filter capacitor connected to a second terminal of the inductor for filtering the ramping current through the inductor and providing the regulated output voltage.*

*32. The regulator of claim 31 wherein the inductor begins to saturate prior to 75% of the maximum load current.*

*33. The regulator of claim 31 wherein the inductor begins to saturate prior to 50% of the maximum load current.*

*34. The regulator of claim 31 wherein the inductor begins to saturate prior to 40% of the maximum load current.*

*35. The regulator of claim 31 wherein the inductor begins to saturate at 30% of the maximum load current.*

*36. The regulator of claim 31 wherein the inductor begins to saturate prior to 20% of the maximum load current.*

*37. The regulator of claim 31 wherein the inductor begins to saturate prior to 10% of the maximum load current.*

*38. The regulator of claim 31 wherein the inductor fully saturates at a current below 75% of the maximum load current.*

*39. The regulator of claim 31 wherein the switching regulator is a buck regulator.*

*40. The regulator of claim 31 wherein the switching regulator is a pulse width modulation regulator.*

*41. The regulator of claim 31 wherein the switching regulator and inductor are formed as a single integrated circuit.*

*42. The regulator of claim 31 wherein the regulated output voltage is coupled to circuitry in an electrical device that operates in a low current mode for a majority of the time, where the inductor does not operate in saturation during the low current mode.*

*43. The regulator of claim 42 wherein the electrical device is a cellular telephone.*

*44. A method performed by a DC-DC step down transformerless switching voltage regulator, the regulator for providing a maximum load current at a regulated voltage, comprising:*

*generating a pulsed signal by the switching voltage regulator turning on and off a power switch, a first terminal of the power switch being connected to a power supply;*

*applying the pulsed signal to a non-transformer inductor, which conducts a ramping current through the inductor, the inductor having an inductance value such that the inductor at least partially saturates at load currents below the maximum load current under normal operating conditions as the inductor conducts the ramping current;*

*at least partially saturating the inductor prior to the regulator reaching the maximum load current;*

*rectifying a signal at a node between the inductor and the power switch by a rectifying device having a first terminal connected to the node between the inductor and the power switch and a second terminal connected to a fixed reference potential, the rectifying device conducting only when a voltage at the first terminal is less than the reference potential; and*

*filtering the ramping current by a filter capacitor to generate the regulated voltage.*

*45. The method of claim 44 wherein the step of at least partially saturating the inductor comprises at least partially saturating the inductor prior to the regulator reaching 75% of the maximum load current.*

* * * * *

UNITED STATES PATENT AND TRADEMARK OFFICE

CERTIFICATE OF CORRECTION

PATENT NO. : RE41,061 E
APPLICATION NO. : 11/874818
DATED : December 29, 2009
INVENTOR(S) : Raymond Zinn It is certified that error appears in the above-identified patent and that said Letters Patent is hereby corrected as shown below:

Column 9,
Line 15, Claim 23, where “a” should read --the--.
Line 31, Claim 25, where “transistor” should read --inductor--.

Signed and Sealed this
Fifteenth Day of February, 2011

David J. Kappos

David J. Kappos
*Director of the United States Patent and Trademark Office*